US012170430B2

(12) United States Patent
Cheong

(10) Patent No.: US 12,170,430 B2
(45) Date of Patent: Dec. 17, 2024

(54) ELECTRIC WIRE CONNECTOR HAVING FIRE-EXTINGUISHING FUNCTION

(71) Applicant: Korea Ocean Tech Co., LTD., Busan (KR)

(72) Inventor: Kwang Hyun Cheong, Busan (KR)

(73) Assignee: Korea Ocean Tech Co., LTD., Busan (KR)

( * ) Notice: Subject to any disclaimer, the term of this patent is extended or adjusted under 35 U.S.C. 154(b) by 282 days.

(21) Appl. No.: 17/919,748

(22) PCT Filed: Aug. 10, 2020

(86) PCT No.: PCT/KR2020/010572
§ 371 (c)(1),
(2) Date: Oct. 19, 2022

(87) PCT Pub. No.: WO2021/235599
PCT Pub. Date: Nov. 25, 2021

(65) Prior Publication Data

US 2023/0155307 A1 May 18, 2023

(30) Foreign Application Priority Data

May 22, 2020 (KR) ........................ 10-2020-0061835

(51) Int. Cl.
*H01R 4/70* (2006.01)
*A62C 3/16* (2006.01)
(Continued)

(52) U.S. Cl.
CPC ................. *H01R 4/70* (2013.01); *A62C 3/16* (2013.01); *A62C 35/10* (2013.01); *H01R 4/22* (2013.01)

(58) Field of Classification Search
CPC ....... A62C 99/0045; A62C 35/10; A62C 3/16; H01R 4/70; H01R 4/22
See application file for complete search history.

(56) References Cited

U.S. PATENT DOCUMENTS

| | | | | |
|---|---|---|---|---|
| 3,576,940 A * | 5/1971 | Stone | ..................... | H01B 7/295 427/119 |
| 4,547,626 A * | 10/1985 | Pedersen | ................ | G02B 6/443 174/109 |

(Continued)

FOREIGN PATENT DOCUMENTS

| | | |
|---|---|---|
| JP | 05-214305 A | 8/1993 |
| JP | 2952597 B2 | 9/1999 |

(Continued)

OTHER PUBLICATIONS

International Search Report of PCT/KR2020/010572 published on Nov. 25, 2021.
Written opinion of PCT/KR2020/010572 published on Nov. 25, 2021.

*Primary Examiner* — William H. Mayo, III
*Assistant Examiner* — Rhadames Alonzo Miller

(57) ABSTRACT

An electric wire connector having fire-extinguishing function includes: a protective holder (100) comprising a conductor cap (120) and an insulator gap (140), wherein the conductor cap (120) accommodates a conductor part 12 of an electric wire connection part (10), wherein the insulator cap (140) wherein the insulator cap (140) has an inner diameter larger than an inner diameter of the conductor cap (120) and accommodates an insulator part (14) of the connection part (10); a metal tube (200) installed within the conductor cap (120) and press-fits in the conductor part (12); and a fire-extinguishing module (300) installed in the insulator cap (140) and having a fire-extinguishing tunnel (302), wherein the fire-extinguishing tunnel (302) is provided in the insulator cap (140), wherein the insulator part (14) is inserted in the fire-extinguishing tunnel, wherein the fire-extinguishing powder is ejected in response to a heat of a fire.

7 Claims, 8 Drawing Sheets

(51) Int. Cl.
*A62C 35/10* (2006.01)
*H01R 4/22* (2006.01)

(56) References Cited

U.S. PATENT DOCUMENTS 4,670,624 A * 6/1987 de Decker ............. H01B 17/42 174/140 R
4,800,351 A * 1/1989 Rampalli ............. H01Q 13/203 333/237
5,462,803 A * 10/1995 Wessels ................. H01B 7/295 428/383
5,561,185 A * 10/1996 Hashimoto ............ H01B 7/295 524/444
5,898,350 A * 4/1999 Aberasturi ........... H01Q 13/203 333/237
2013/0240239 A1* 9/2013 Kimura .................. C09K 21/14 524/262
2015/0062896 A1* 3/2015 Doi ............................ C08J 5/18 524/847
2015/0380921 A1* 12/2015 Juillet .................. H02G 15/184 174/135
2016/0099126 A1* 4/2016 Blemel .................. G01K 11/18 337/382
2017/0011822 A1* 1/2017 Nakamura ............. H01B 7/295
2017/0365373 A1* 12/2017 Hirano ................... H01B 7/292
2018/0013213 A1 1/2018 Wang et al.
2018/0201750 A1* 7/2018 Sato ......................... C08K 3/04
2018/0202584 A1* 7/2018 Sato ........................ F16L 11/04
2018/0286618 A1* 10/2018 Blemel ............. H01L 29/78663
2020/0373688 A1* 11/2020 Moshggoo ......... H02G 15/1806

FOREIGN PATENT DOCUMENTS

KR 10-0545049 B1 1/2006
KR 10-2009-0039366 A 4/2009
KR 10-2017-0027963 A 3/2017
KR 10-2020-0011067 A 2/2020
KR 10-2138928 B1 7/2020

* cited by examiner

ELECTRIC WIRE CONNECTOR HAVING FIRE-EXTINGUISHING FUNCTION

TECHNICAL FIELD

The present disclosure relates to an electric wire connector having a fire-extinguishing function, and more particularly, to an electric wire connector having a fire-extinguishing function, which can efficiently suppress embers attributable to the outbreak of a fire, such as a spark that is generated in an electric wire connection part, at an early stage.

BACKGROUND ART

In general, electronic and electrical products that are operated by electricity require many parts with the advancement of the technology. Various parts are used by interconnecting electric wires. Electric wires are mutually connected if necessary in a wiring work for using electricity in vehicles or common households.

For example, most of electric wire connection parts are subjected to insulation processing by winding insulating tapes. However, the insulating tape has weak fixing power due to its nature and is easily peeled off as an adhesive portion thereof becomes sticky over time. Accordingly, this frequently leads to the outbreak of a fire attributable to an electrical short or a safety accident such as an electric shock.

Accordingly, Korean Patent Application Publication No. 10-2009-0039366 that has been conventionally disclosed has previously suggested a technology, including a first body the end of which on one side thereof is formed to be blocked by using synthetic resin of an insulating material and which forms a first space part which has a first diameter that accommodates therein an electric wire connection part in which the sheaths of two or more separated electric wire are peeled off in a way to be mutually electrified and which has a cylindrical shape, a second body which is formed to form a body using the same synthetic resin of an insulating material as the first body and which forms a second space part that is connected to the first space part and has a second diameter greater than the first diameter and the end of which at the other side thereof corresponding to the end of the first body on one side thereof is opened, a charging unit which is formed to fill the inside of at least the second space part with a filler that has a gel state and that is coagulated when exposed to the air and which waterproofs the electric wire connection part, and a sealing tape which is formed of synthetic resin that does not transmit the air at an end surface thereof on the other side of the second body and which is adhered to seal the charging unit.

Furthermore, Korean Patent No. 10-0545049, that is, another conventional technology, previously registered a technology, wherein in a holder for an electric wire connection including a housing which has a given space therein and one side of which is opened to form an inlet part; a gel type coagulant which is filled into a space part within the housing and which has insulating properties; and a sealing cover which is mounted on the inlet part of the housing so that the coagulant is sealed, wherein the sealing cover includes a cover surface having a shape corresponding to the inlet part of the housing, an attachment surface which is formed along the outer circumference surface of the cover surface, and a handle part which is formed to protrude on one side of the attachment surface, and a cover mounting part into which the attachment surface of the sealing cover is closely inserted is formed along the inner circumference surface thereof at the inlet part of the housing.

However, the conventional technologies are technologies for preventing a danger, such as an electrical short and an electric shock accident by shielding an electric wire connection part, but have a high probability that a spark may occur due to a contact failure in view of the electric wire connection part and have a negative effect in that a spark leads to a large fire because the spark cannot be suppressed at an early stage although the spark is ignited by small embers.

SUMMARY OF THE INVENTION

Technical Problem

Accordingly, the present disclosure has been invented to solve the problems, and an object of the present disclosure is to provide an electric wire connector having a fire-extinguishing function, which can prevent a large fire by rapidly suppressing embers at an early stage in a way that fire-extinguishing powder is automatically ejected in response to heat at timing at which embers are early ignited due to a factor, such as a spark or a short circuit occurring at an electric wire connection part.

Technical Solution

In order to accomplish such an object, a characteristic of the present disclosure includes a protective holder (100) including a conductor cap (120) that accommodates a conductor part (12) of an electric wire connection part (10) and an insulator cap (140) that is formed to be extended compared to an inner diameter of the conductor cap (120) and that accommodates an insulator part (14) of the connection part (10), a metal tube (200) installed within the conductor cap (120) and provided to press-fit and bind the conductor part (12), and a fire-extinguishing module (300) installed in the insulator cap (140) and configured to have a fire-extinguishing tunnel (302) formed therein so that the insulator part (14) is inserted through the fire-extinguishing tunnel and to have fire-extinguishing powder ejected in response to the heat of a fire.

In this case, the fire-extinguishing module (300) is formed by molding a fire extinguishing mixture including the fire-extinguishing powder and a heat-resistant binder.

Furthermore, the fire-extinguishing module (300) includes inner and outer tubes (310) and (320) formed of a thin film compared to the insulator cap (140), a fire-extinguishing room (330) formed between the inner and outer tubes (310) and (320), and a fire extinguishing mixture (340) including the fire-extinguishing powder filled within the fire-extinguishing room (330). The fire-extinguishing room (330) has one end closed and has an opening (332) formed at the other end thereof. After the fire extinguishing mixture (340) is input into the fire-extinguishing room (330) through the opening (332), the fire-extinguishing room (330) is constructed by cutting the end part thereof after the opening (332) is finished through thermosetting of the inner and outer tubes (310) and (320) or is provided to close the opening (332) by using a cover sheet (334).

Furthermore, the fire-extinguishing module (300) has an extension tube (350) extended at one end thereof. A locking projection (352) is formed at the end of the extension tube (350). The extension tube (350) is provided so that a locking projection (352) is confined at the end of the metal tube (200) in the state in which the extension tube (350) has been fit and couple between the conductor cap (120) and the insulator cap (140).

Furthermore, the fire-extinguishing module (300) has an insertion groove (304) formed on one side of the fire-extinguishing tunnel (302). The metal tube (200) is connected to the fire-extinguishing module (300) by forced fitting, adhesion, or fixing means including a trapping groove and a jaw in the state in which one end of the metal tube (200) has been inserted into the insertion groove (304).

Furthermore, the metal tube (200) has a plurality of heat dissipation pins (220) formed at one end thereof. The heat dissipation pins (220) extend into the fire-extinguishing module (300). When the conductor part (12) is overheated due to a short circuit of the electric wire connection part (10) or the heat of a fire, the metal tube (200) is provided so that heat generated from the conductor part (12) is conducted into the fire-extinguishing module (300) through the heat dissipation pins (220) connected to the metal tube (200).

Furthermore, a dome-shaped compartment (122) is formed at one end of the conductor cap (120) corresponding to the end of the conductor part (12). The dome-shaped compartment (122) is formed to have a thin thickness compared to another region of the conductor cap (120). A heat expansion layer (124) and a pigment layer (125) are provided within the dome-shaped compartment (122). When the conductor part (12) is overheated due to a short circuit of the electric wire connection part (10) or the heat of a fire, the dome-shaped compartment (122) is exploded by an expansive force of the heat expansion layer (124) and the pigment (125) is scattered to an outside, so that a symptom of the fire is identified by a naked eye at an early stage.

Advantageous Effects

According to the above constructions and actions, the present disclosure has an effect having a fire-extinguishing function capable of preventing a large fire by rapidly suppressing the ignition of embers at an early stage through the improvement of a structure in which the fire-extinguishing powder is automatically ejected in response to heat at timing at which the embers are early ignited due to a factor, such as a spark or a short circuit occurring at an electric wire connection part.

Furthermore, the present disclosure has an advantage in that it can detect the symptom of a fire, such as a spark or a short circuit in an electric wire connection part, at an early stage and take measures, based on traces of an explosion in the dome-shaped compartment, which is formed by the pigment layer, although the electric wire connection part is not found and checked by the naked eye one by one in a meter-reading process.

BEST MODE FOR CARRYING OUT THE INVENTION

Hereinafter, preferred embodiments of the present disclosure are described in detail with reference to the accompanying drawings.

Figure 1:
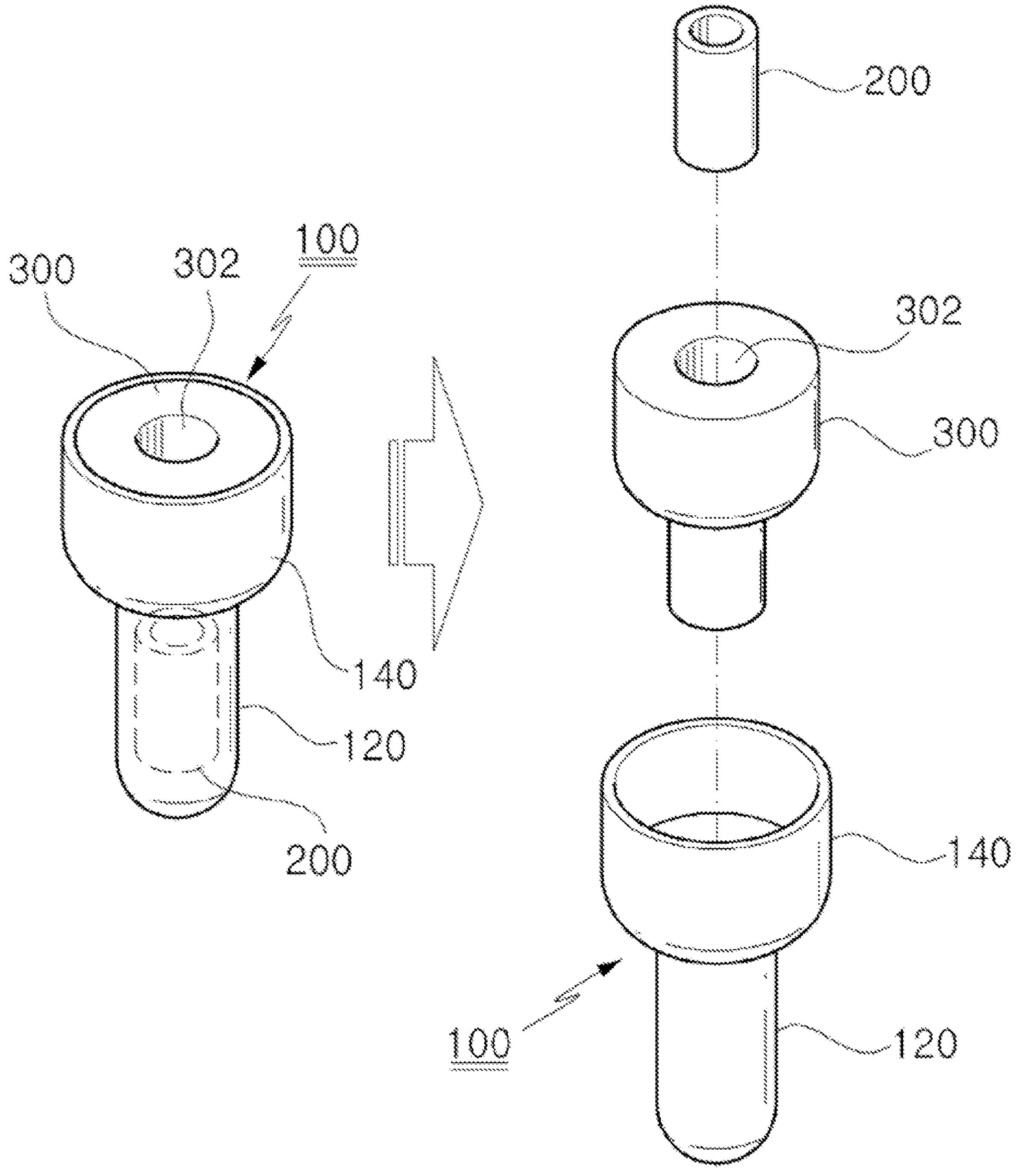
FIG. 1 is a perspective view generally illustrating an electric wire connector having a fire-extinguishing function according to an embodiment of the present disclosure.
Figure 2:
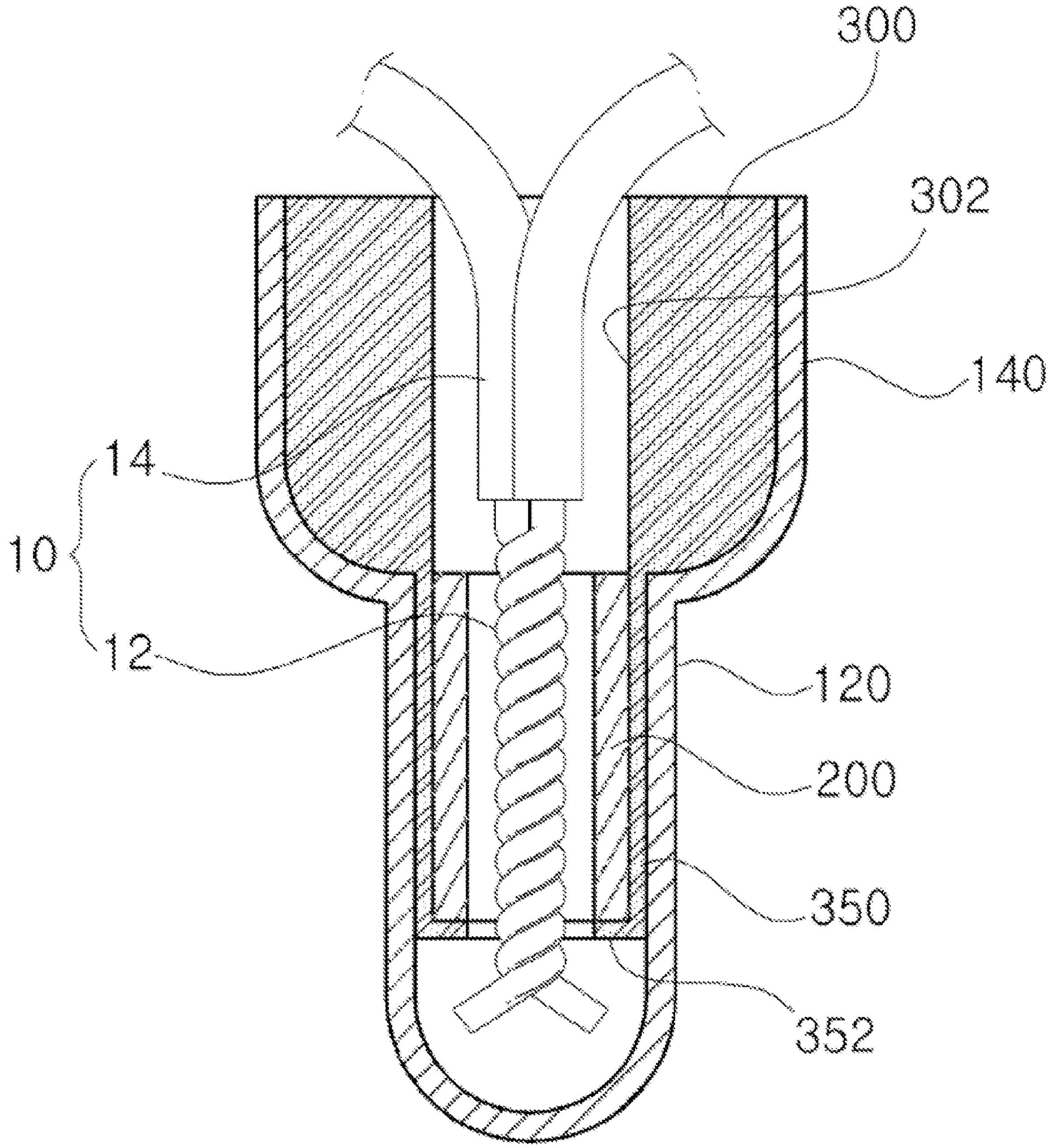
FIG. 2 is a cross-sectional view of the electric wire connector having a fire-extinguishing function according to an embodiment of the present disclosure.

FIG. 1 is a perspective view illustrating a preferred embodiment of an electric wire connector having a fire-extinguishing function, which is provided by the present disclosure, and FIG. 2 is a cross-sectional view thereof. The present disclosure includes major components, including a protective holder (100), a metal tube (200), and a fire-extinguishing module (300), in order to prevent a large fire by rapidly suppressing the ignition of embers at an early stage through the improvement of a structure so that fire-extinguishing powder is automatically ejected in response to heat at timing at which the embers are early ignited due to a factor, such as a spark or a short circuit occurring at an electric wire connection part.

The protective holder (100) according to the present disclosure includes a conductor cap (120) that accommodates a conductor part (12) of an electric wire connection part (10) and an insulator cap (140) that is formed to be extended compared to an inner diameter of the conductor cap (120) and that accommodates an insulator part (14) of the connection part (10). That is, the conductor cap (120) and insulator cap (140) of the protective holder (100) are integrally formed so that both the conductor part (12) and the insulator part (14) are accommodated. In this case, the conductor part (12) is a part in which inner wires from which a cable sheath has been removed are twisted and bound. The insulator part (14) refers to some area of a cable sheath that comes into contact with the conductor part (12).

The conductor cap (120) is formed of an insulating tubular body one end of which is closed, and has the metal tube (200) installed therein, which is described later. The insulator cap (140) is an insulating tubular body that is integrally connected to the other end of the conductor cap (120) and that is formed to have an extended size compared to the diameter of the conductor cap (120), and has the fire-extinguishing module (300) installed therein, which is described later.

The metal tube (200) according to the present disclosure is installed in the conductor cap (120) and is provided so as to press-fit and bind the conductor part (12). The metal tube (200) is formed of a body made of a metal material including aluminum, iron, or stainless steel.

The metal tube (200) is crushed and deformed when the conductor cap (120) is compressed by a tool including pincers in the state in which the conductor part (12) of the electric wire connection part (10) has been inserted therein. At this time, the metal tube (200) binds the conductor part (12) while being deformed. Accordingly, the conductor cap (120) of the protective holder (100) forms a firm coupling state without being detached from the conductor part (12).

The fire-extinguishing module (300) according to the present disclosure is installed in the insulator cap (140), and it has a fire-extinguishing tunnel (302) formed therein so that the insulator part (14) is inserted through the fire-extinguishing tunnel and includes fire-extinguishing powder so that the fire-extinguishing powder performs a fire-extinguishing action in response to the heat of a fire. That is, the fire-extinguishing module (300) performs a fire-extinguishing action as the fire-extinguishing powder is ejected upon exposure to the heat of a fire. The fire-extinguishing tunnel (302) is formed to penetrate the fire-extinguishing module (300) in a way to surround the outer diameter of the insulator part (14) that neighbors the conductor part (12).

As described above, the conductor part (12) of the electric wire connection part (10) is inserted into the metal tube (200) through the fire-extinguishing tunnel (302) of the fire-extinguishing module (300). The insulator part (14) is protected in the state in which the insulator part (14) has been accommodated in the fire-extinguishing tunnel (302) of the fire-extinguishing module (300). In this case, the fire-extinguishing module (300) is implemented in various forms, and for corresponding detailed descriptions, reference is made to FIGS. 2 and 3.

Accordingly, when a fire occurs due to a factor, such as a spark or a short circuit occurring in the conductor part (12), fire-extinguishing powder is ejected because the fire-extinguishing module (300) responds to heat. Accordingly, there is an advantage in that the outbreak of a fire can be prevented in an area that neighbors the electric wire connection part (10) in addition to the insulator part (14).

Meanwhile, the fire-extinguishing module (300) is formed by performing compression molding or adhesive molding on a fire extinguishing mixture including fire-extinguishing powder and a heat-resistant binder. The fire-extinguishing powder has a fire-extinguishing agent accommodated in a capsule section, and is formed in a micro-capsule type in which the capsule section is broken in response to heat and the fire-extinguishing agent is ejected. The heat-resistant binder is a heat-resistant substance including ceramics, minerals, or resins. The heat-resistant binder includes a heat-resistant adhesive material.

That is, the fire-extinguishing module (300) is formed of a tubular body in which the fire extinguishing mixture including the fire-extinguishing powder and the heat-resistant binder is molded to adhere thereto and the fire-extinguishing tunnel (302) is formed at the center thereof, and is inserted and installed in the insulator cap (140).

Accordingly, when the fire-extinguishing module (300) is exposed to heat, the fire-extinguishing powder is ejected. At this time, the fire-extinguishing powder is ejected into an internal section thereof formed by the insulator cap (140) and is concentrated and supplied to the electric wire connection part (10). Accordingly, embers that early occur is rapidly suppressed at an early stage.

Figure 3:
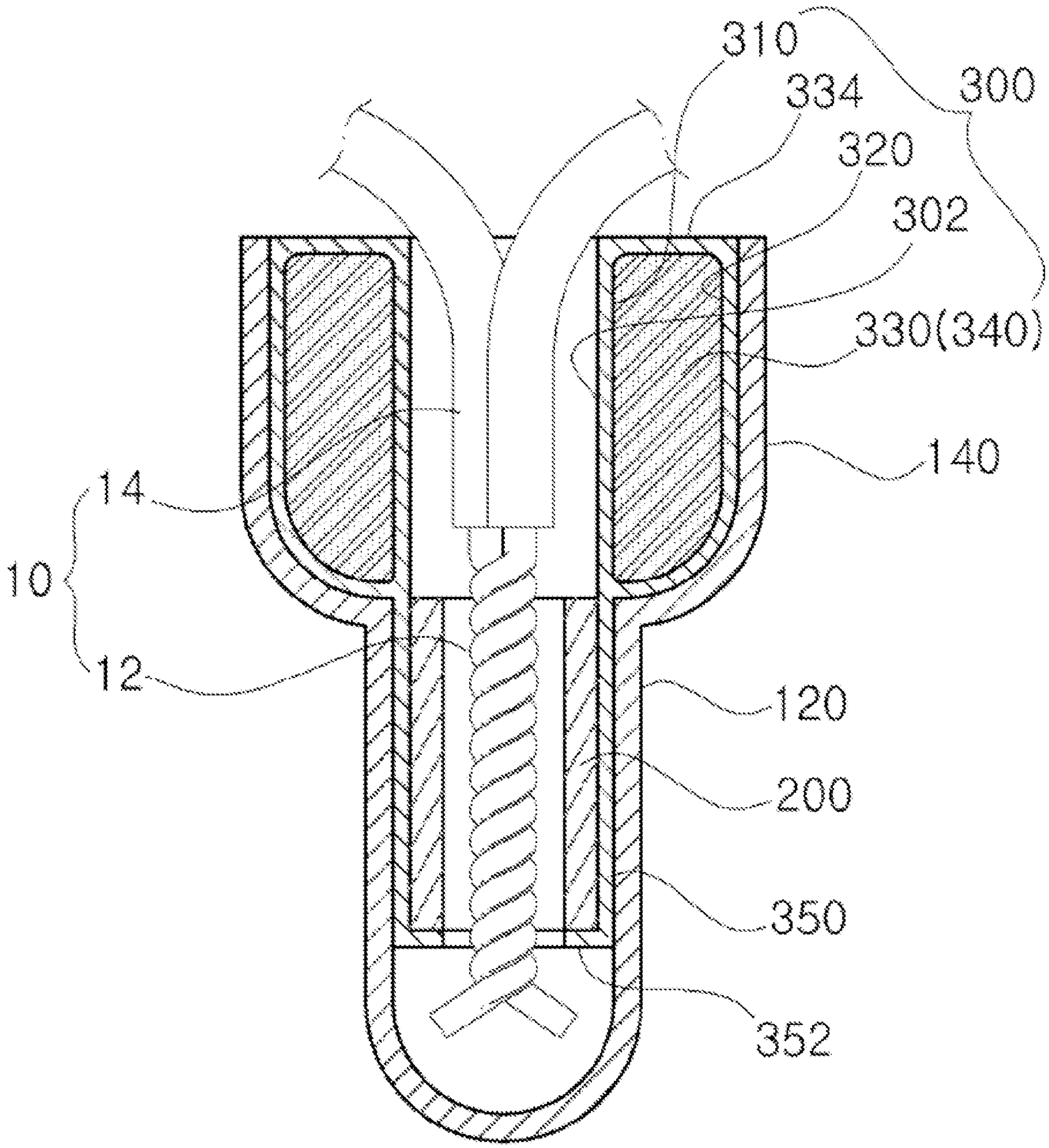
FIG. 3 is a construction diagram illustrating a modified example of a fire-extinguishing module of the electric wire connector having a fire-extinguishing function, which is provided by the present disclosure.

FIG. 3 is a construction diagram illustrating a modified example of the fire-extinguishing module of the electric wire connector having a fire-extinguishing function, which is provided by the present disclosure. The fire-extinguishing module (300) includes inner and outer tubes (310) and (320) formed of a thin film compared to the insulator cap (140), a fire-extinguishing room (330) formed between the inner and outer tubes (310) and (320), and a fire extinguishing mixture (340) including fire-extinguishing powder filled within the fire-extinguishing room (330).

Figure 4:
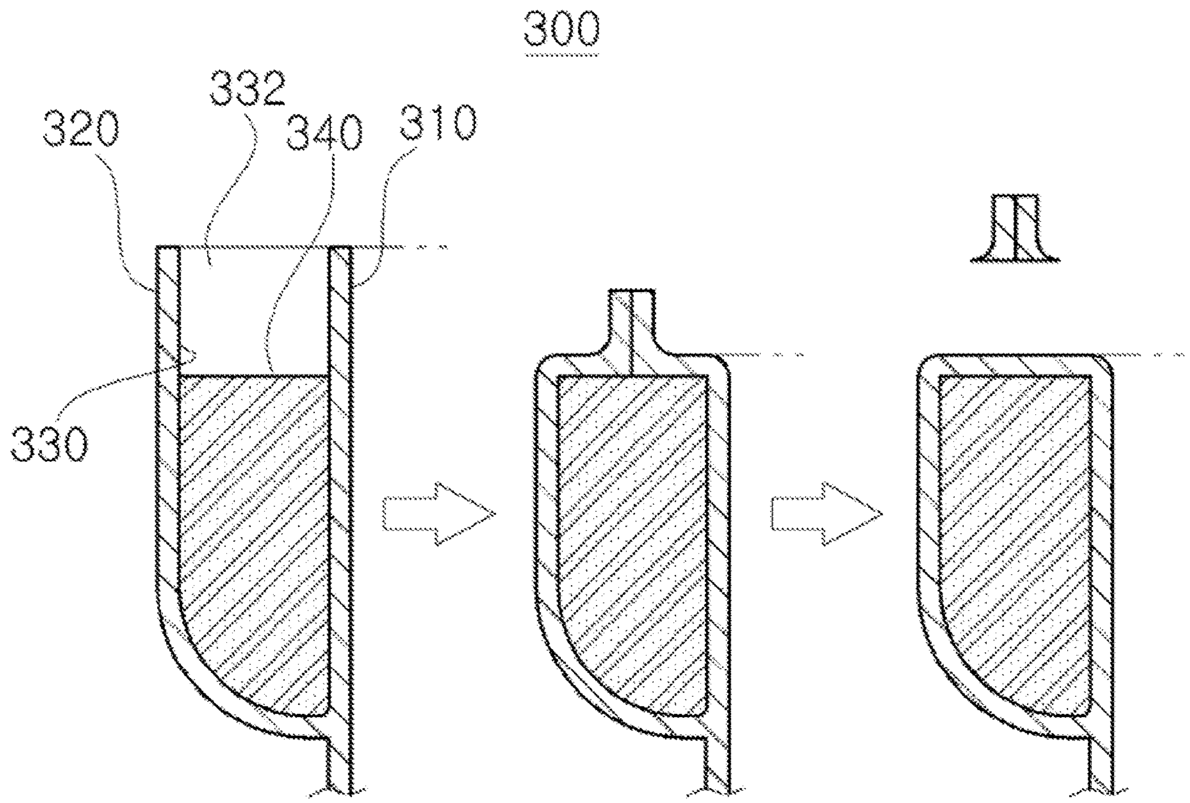
FIGS. 4 and 5 are construction diagrams illustrating a step of filling the fire-extinguishing module of the electric wire connector having a fire-extinguishing function according to an embodiment of the present disclosure with a fire extinguishing mixture.
Figure 5:
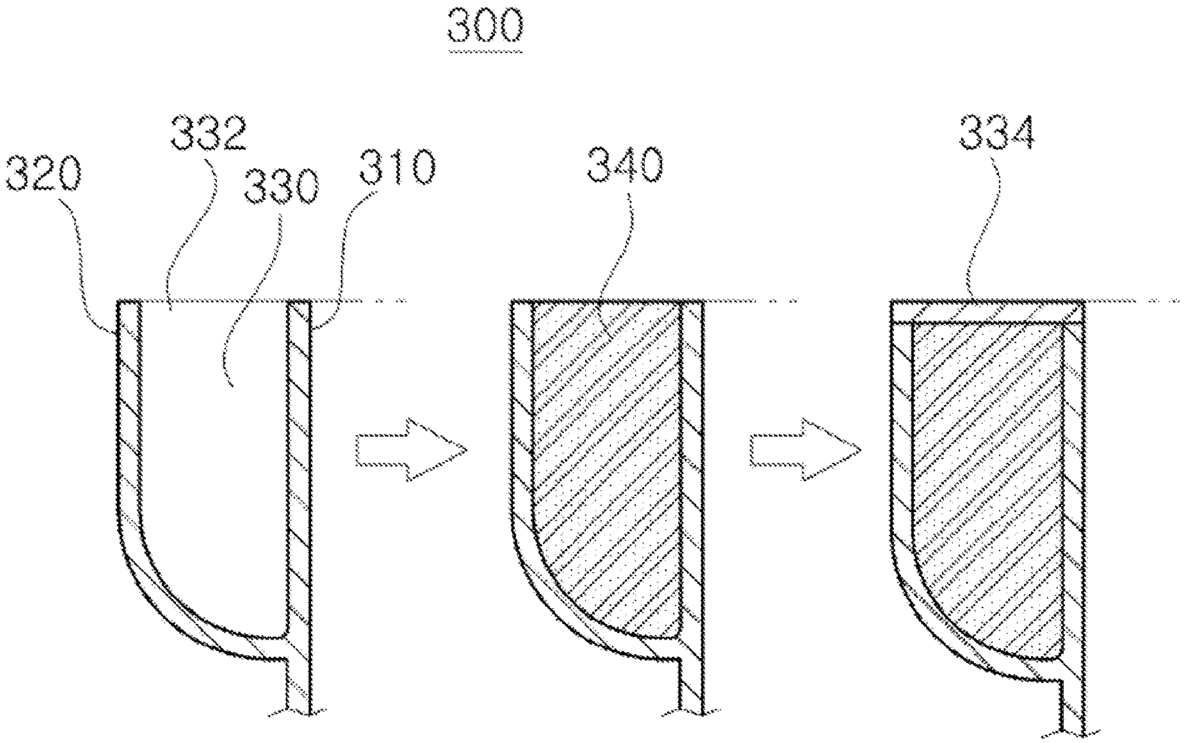

Furthermore, the fire-extinguishing room (330) has one end closed and has an opening (332) formed at the other end thereof. After the fire extinguishing mixture (340) is input into the fire-extinguishing room (330) through the opening (332), the fire-extinguishing room (330) may be constructed by cutting an end part thereof after the opening (332) is finished through the thermosetting of the inner and outer tubes (310) and (320) as in FIG. 4 or is provided to close the opening (332) by using a cover sheet (334) as in FIG. 5.

Accordingly, when the fire-extinguishing module (300) is exposed to heat, the fire-extinguishing powder is ejected and pressure within the fire-extinguishing room (330) rises. At this time, since the outer tube (320) has been protected by the inner circumference surface of the insulator cap (140), the inner tube (310) having relatively weak durability first explodes, and the fire-extinguishing powder is concentrated and supplied to the electric wire connection part (10), so that embers that early occur are suppressed at an early stage.

In FIGS. 2 to 3, the fire-extinguishing module (300) has an extension tube (350) extended at one end thereof. A locking projection (352) is formed at the end of the extension tube (350). The extension tube (350) is provided so that the locking projection (352) is confined at the end of the metal tube (200) in the state in which the extension tube (350) has been fit and couple between the conductor cap (120) and the insulator cap (140).

That is, in a process of inserting and installing the metal tube (200) in the conductor cap (120), the locking projection (352) of the extension tube (350) is trapped at the end of the extension tube (350) and inserted into the conductor cap (120) along with the extension tube (350). At this time, the extension tube (350) has been fit and coupled between the conductor cap (120) and the insulator cap (140) in a pressurized state, and a position thereof is simply fixed.

As described above, as the fire-extinguishing module (300) is indirectly fixed by the extension tube (350) in the state in which the fire-extinguishing module (300) has been inserted into the insulator cap (140), a manufacturing process is simplified because separate adhesives or physical fixing means for fixing the fire-extinguishing module (300) can be omitted. Particularly, as in FIG. 2, although the fire-extinguishing module (300) has slightly weak fragility because the fire-extinguishing module (300) is formed of a molded body, a direct and external fixed force for coupling the protective holder (100) to the connection part (10) does not affect the fire-extinguishing module (300). Accordingly, there is no problem in that the fire-extinguishing module (300) is broken during a keeping and installation process.

Figure 6:
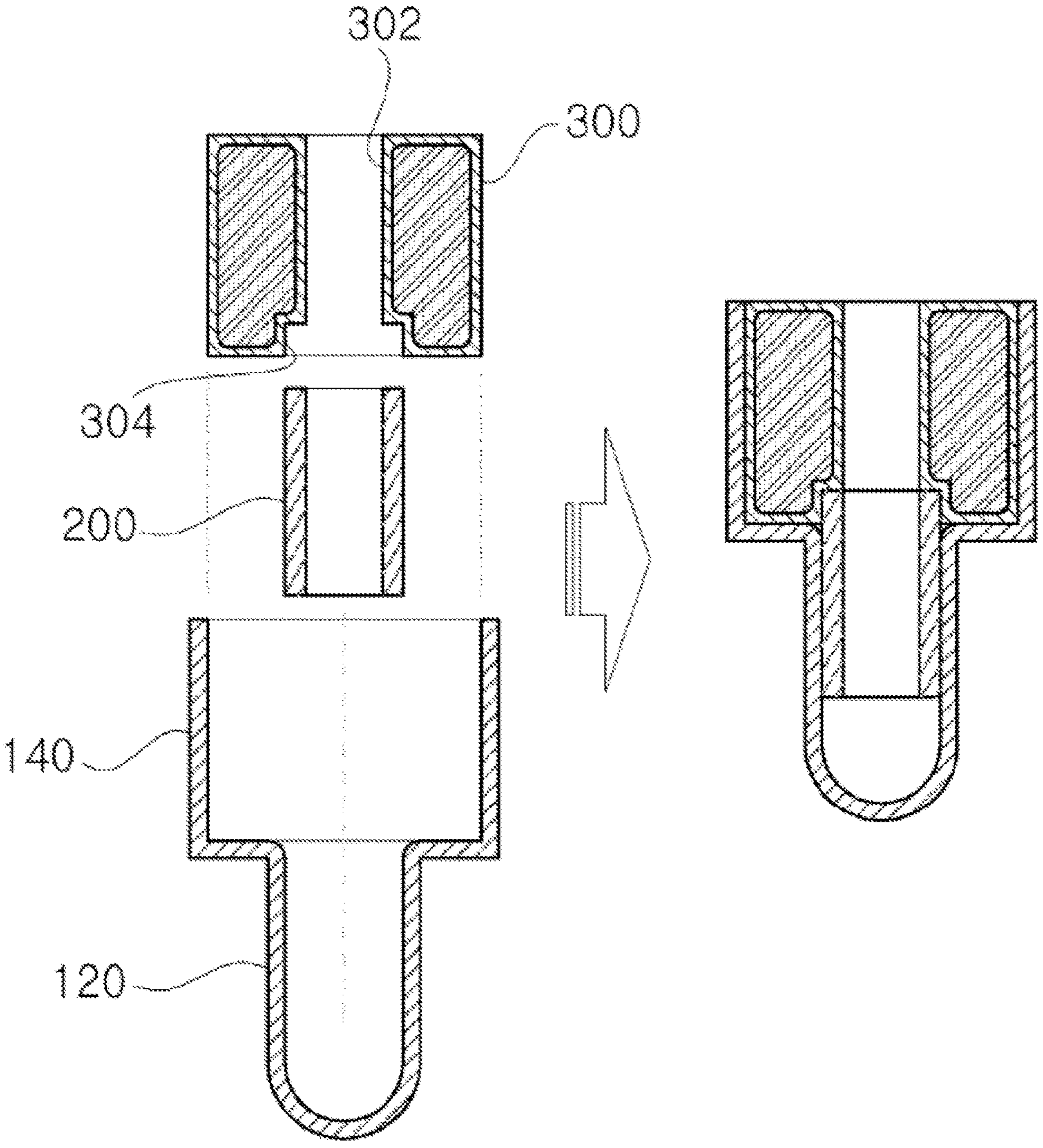
FIG. 6 is a cross-sectional view illustrating a structure of the electric wire connector having a fire-extinguishing function according to another embodiment, which is provided by the present disclosure.

FIG. 6 is a cross-sectional view illustrating another embodiment of the electric wire connector having a fire-extinguishing function, and illustrates a structure for connecting the fire-extinguishing module and the metal tube. The fire-extinguishing module (300) includes an insertion groove (304) formed on one side of the fire-extinguishing tunnel (302). The metal tube (200) is connected to the fire-extinguishing module (300) by forced fitting, adhesion, or fixing means including a trapping groove and a jaw in the state in which one end of the metal tube (200) has been inserted into the insertion groove (304).

In this case, when the fire-extinguishing module (300) is formed of a molded body (e.g., a form of the fire-extinguishing module (300) in FIG. 2), it is preferred that the metal tube (200) has one end insert-molded into the insertion groove (304). Furthermore, if the fire extinguishing mixture (340) is formed to be protected by the inner and outer tubes (310) and (320), the insertion groove (304) is formed at one end of the fire-extinguishing module (300) and coupled with the metal tube (200).

As described above, as the fire-extinguishing module (300) is indirectly fixed by the metal tube (200), a manufacturing process is simplified because separate adhesives or physical fixing means for fixing the fire-extinguishing module (300) is omitted. Particularly, as in FIG. 2, although the fire-extinguishing module (300) has weak fragility because the fire-extinguishing module (300) is formed of a molded matter, the fire-extinguishing module (300) is prevented from being broken in a keeping and installation process because direct fixing power does not affect the fire-extinguishing module (300).

Figure 7:
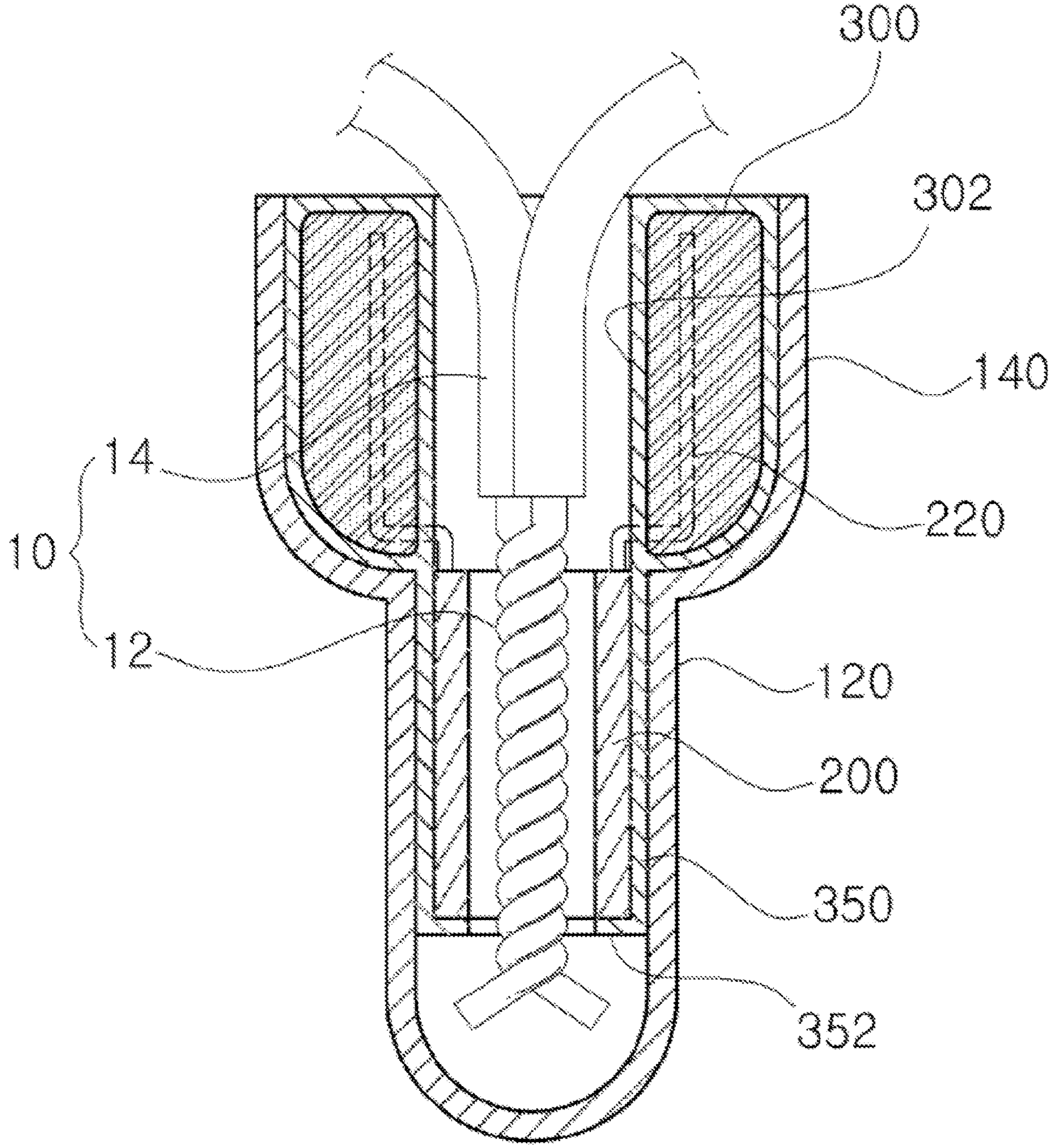
FIG. 7 is a construction diagram illustrating a heat dissipation pins of the electric wire connector having a fire-extinguishing function according to the present disclosure.

FIG. 7 illustrates another embodiment of the electric wire connector having a fire-extinguishing function, which is provided by the present disclosure. The metal tube (200) has a plurality of heat dissipation pins (220) formed at one end thereof. The plurality heat dissipation pins (220) extends into the fire-extinguishing module (300). The heat dissipation pins (220) are integrally at the end of the metal tube (200) or the heat dissipation pins (220) are separately formed installed to come into contact with each other.

Furthermore, when the conductor part (12) is overheated due to a short circuit of the electric wire connection part (10) or the heat of a fire, the metal tube (200) is provided so that heat generated from the conductor part (12) is conducted into the fire-extinguishing module (300) through the heat dissipation pins (220) connected to the metal tube (200).

Accordingly, at the moment when heat is generated from the heat dissipation pins (220) due to the spark or the short circuit and the metal tube (200) is heated, the heat of the metal tube (200) is shared with the fire-extinguishing module (300) through the heat dissipation pins (220) and thus the fire extinguishing mixture (340) is ejected immediately in response to the heat. Accordingly, embers that early occur can be suppressed at an early stage in accordance with a short circuit of the electric wire connection part (10) or a fire.

Figure 8:
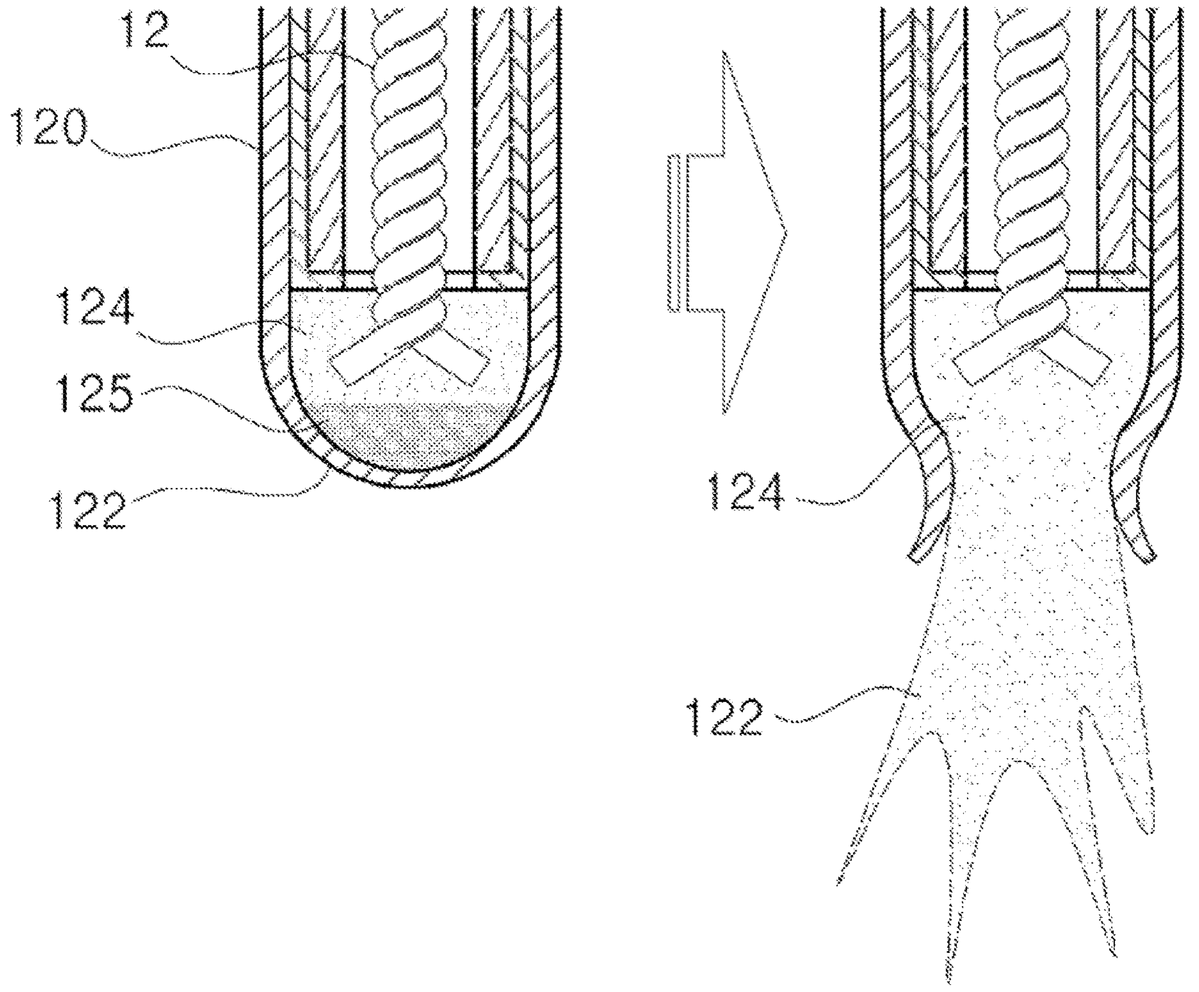
FIG. 8 is a construction diagram illustrating a dome-shaped compartment of the electric wire connector having a fire-extinguishing function according to the present disclosure.

FIG. 8 is a construction diagram illustrating a dome-shaped compartment of the electric wire connector having a fire-extinguishing function according to the present disclosure. A dome-shaped compartment (122) is formed at one end of the conductor cap (120) corresponding to the end of the conductor part (12). The dome-shaped compartment (122) is formed to have a thin thickness compared to another region of the conductor cap (120). A heat expansion layer (124) and a pigment layer (125) are provided within the dome-shaped compartment (122).

In this case, the heat expansion layer (124) is formed of a mixture including calcium carbonate and aluminum metal oxide, and is formed to neighbor the conductor part (12). The pigment layer (125) is formed to neighbor the inner circumference surface of the dome-shaped compartment (122).

As described above, when the conductor part (12) is overheated due to a short circuit of the electric wire connection part (10) or the heat of a fire, the dome-shaped compartment (122) is exploded by an expansive force of the heat expansion layer (124) and the pigment (125) is scattered to the outside, so that the symptom of the fire can be identified by the naked eye at an early stage.

That is, when the conductor part (12) reaches a given temperature (an ignition point), the heat expansion layer (124) is expanded in response to heat and reaches given pressure, and thus the dome-shaped compartment (122) is exploded. At this time, the pigment layer (125) is scattered to the outside of the dome-shaped compartment (122), so that traces of the explosion remain around.

Accordingly, although the electric wire connection part (10) is not found and checked by the naked eye one by one in a meter-reading process, the symptom of a fire, such as a spark or a short circuit of the electric wire connection part (10) can be found and measures can be taken at an early stage based on traces of an explosion of the dome-shaped compartment (122) formed by the pigment layer (125). Accordingly, there is an advantage in that a large fire can be prevented.

As described above, the most preferred embodiment of the present disclosure has been described in the detailed description of the present disclosure, but will be modified in various ways without departing from the technical range of the present disclosure. Accordingly, the scope of rights of the present disclosure should not be limited to the embodiments, and should be recognized up to the technologies of the claims and equivalent technical means from these technologies.

INDUSTRIAL APPLICABILITY

The electric wire connector having a fire-extinguishing function according to the present disclosure may be widely applied to electronic equipment for fire fighting because the electric wire connector can efficiently early suppress embers attributable to an overcurrent, a spark, etc. which is generated at an electric wire connection part.

What is claimed is:

1. An electric wire connector having fire-extinguishing function, comprising:

a protective holder (100) comprising a conductor cap (120) and an insulator cap (140), wherein the conductor cap (120) accommodates a conductor part 12 of an electric wire connection part (10), wherein the insulator cap (140), wherein the insulator cap (140) has an inner diameter larger than an inner diameter of the conductor cap (120) and accommodates an insulator part (14) of the connection part (10);

a metal tube (200) installed within the conductor cap (120) and press-fits in the conductor part (12); and a fire-extinguishing module (300) installed in the insulator cap (140) and having a fire-extinguishing tunnel (302), wherein the fire-extinguishing tunnel (302) is provided in the insulator cap (140), wherein the insulator part (14) is inserted in the fire-extinguishing tunnel, wherein the fire-extinguishing powder is ejected in response to a heat of a fire.

2. The electric wire connector of claim 1, wherein the fire-extinguishing module (300) includes a fire extinguishing mixture, wherein the fire extinguishing mixture includes the fire-extinguishing powder and a heat-resistant binder.

3. The electric wire connector of claim 1, wherein the fire-extinguishing module (300) comprises an inner tube (310), an outer tubes (320), a fire-extinguishing room (330), and a fire extinguishing mixture (340), wherein each of the inner tube (310) and the outer tube (320) is formed of a film thinner than the insulator cap (140), wherein the fire-extinguishing room (330) is provided between the inner tube (310) and the outer tube (320), wherein the fire extinguishing mixture (340) includes the fire-extinguishing powder which is filled within the fire-extinguishing room (330), wherein the fire-extinguishing room (330) has a first end and a second end, wherein the first end is closed, wherein the second end has an opening (332), wherein the fire extinguishing mixture (340) is provided into the fire-extinguishing room (330) through the opening (332), wherein the fire-extinguishing room (330) is constructed by cutting an end part thereof after the opening (332) is finished through thermosetting of the inner and outer tubes (310) and (320) or is provided to close the opening (332) by using a cover sheet (334).

4. The electric wire connector claim 1.

wherein an extension tube (350) is formed at one end of the fire-extinguishing module (300), wherein a locking projection (352) is formed at an end of the extension tube (350), wherein a locking projection (352) is confined at an end of the metal tube (200), wherein the extension tube (350) fits between the conductor cap (120) and the insulator cap (140).

5. The electric wire connector claim 1, wherein the fire-extinguishing module (300) has an insertion groove (304) formed on one side of the fire-extinguishing tunnel (302), wherein the metal tube (200) is connected to the fire-extinguishing module (300) by forced fitting, adhesion, or a fixer, wherein the fixer is a trapping groove or a jaw, wherein one end of the metal tube (200) is inserted into the insertion groove (304).

6. The electric wire connector claim 1, wherein heat dissipation pins (220) are formed at one end of the metal tube (200), wherein the heat dissipation pins (220) extend into the fire-extinguishing module (300), and wherein, when the conductor part (12) is overheated due to a short circuit of the electric wire connection part (10) or a heat of a fire, the metal tube (200) transfers heat generated from the conductor part 12 to the fire-extinguishing module (300) through the heat dissipation pins (220) connected to the metal tube (200).

7. The electric wire connector claim 1, wherein a dome-shaped compartment (122) is formed at one end of the conductor cap (120) corresponding to an end of the conductor part (12), wherein a thickness of the dome-shaped compartment (122) is thinner than another region of the conductor cap (120), wherein a heat expansion layer (124) and a pigment layer (125) are provided within the dome-shaped compartment (122).

* * * * *